United States Patent

[11] 3,583,442

| [72] | Inventor | William W. Dollison<br>Dallas, Tex. |
|---|---|---|
| [21] | Appl. No. | 786,149 |
| [22] | Filed | Dec. 23, 1968 |
| [45] | Patented | June 8, 1971 |
| [73] | Assignee | Otis Engineering Corporation<br>Dallas, Tex. |

[54] ROTARY VALVES
11 Claims, 7 Drawing Figs.

[52] U.S. Cl. ................................................... 137/630.19,
137/629, 137/630.22, 251/63.4, 251/283, 251/315
[51] Int. Cl. ...................................................... F16k 11/14
[50] Field of Search ............................................ 137/630.19,
630.22, 629; 251/315, 283, 63.4

[56] References Cited
UNITED STATES PATENTS

| 2,879,800 | 3/1959 | Komrosky | 137/630.22X |
| 2,894,715 | 7/1959 | Bostock | 251/315 X |
| 3,007,669 | 11/1961 | Fredd | 251/315 X |
| 3,249,124 | 5/1966 | Berryman | 137/630.19 |

*Primary Examiner*—Clarence H. Gordon
*Attorney*—E. Hastings Ackley

ABSTRACT: A rotary valve of the type wherein the valve closure member is movable longitudinally of a flow passage in the valve housing between seats for opening and closing off flow through the passage and having an operating mechanism for rotating the closure member between opened and closed positions with respect to the seats which provide for equalizing fluid pressures on opposite sides of the valve and seat before rotary movement of the valve closure member occurs in either opening or closing the valve.

PATENTED JUN 8 1971  3,583,442
SHEET 1 OF 2
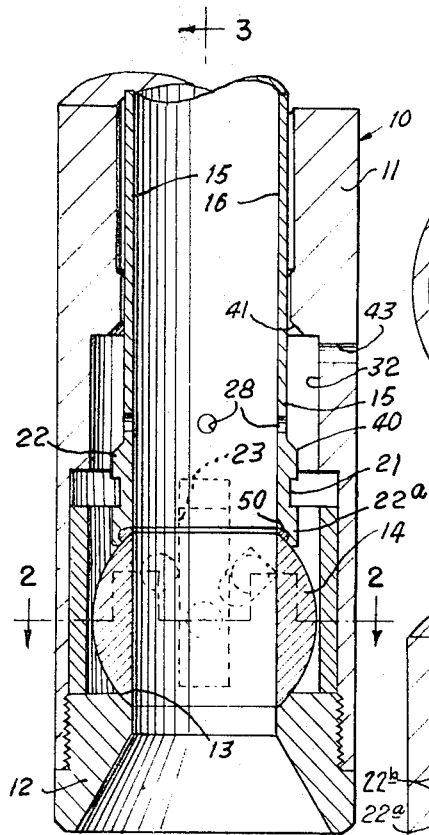
Fig. 1
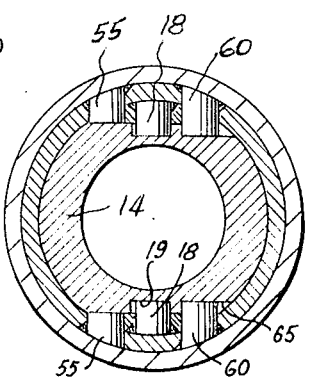
Fig. 2
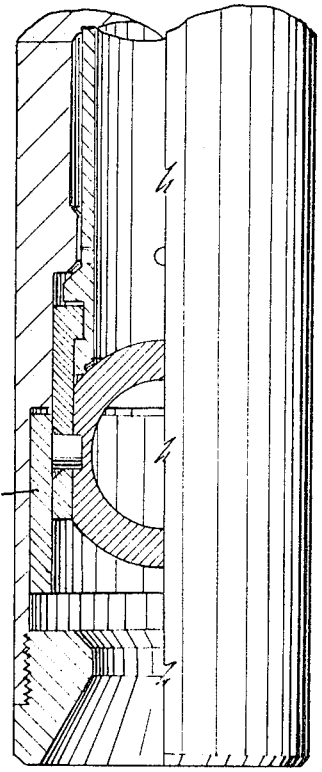
Fig. 5
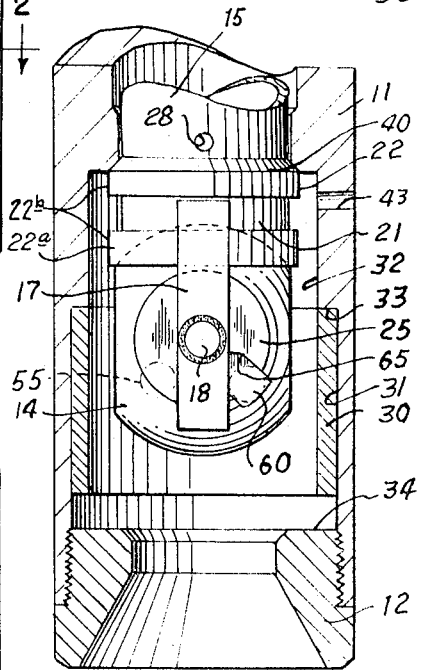
Fig. 4
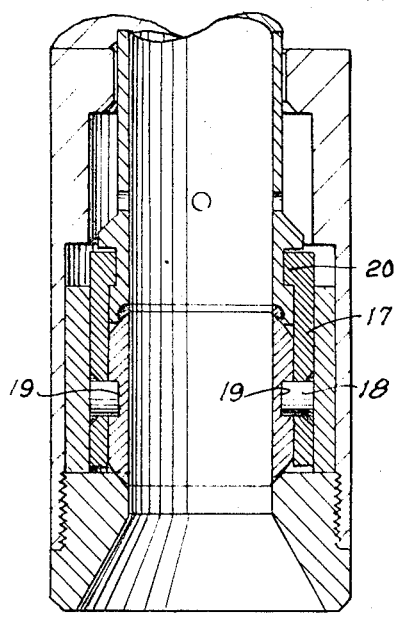
Fig. 3
Fig. 6
INVENTOR
William W. Dollison
BY Hastings Ackley
and Walter J. Jaynes
ATTORNEYS INVENTOR
William W. Dollison

ROTARY VALVES

This invention relates to new and useful improvements in rotary valves, and is particularly directed to a ball valve which is rotated between opened and closed positions as a result of longitudinal movement of the valve closure member with respect to the valve housing.

An important object of the invention is to provide in a ball valve, of the type in which the ball closure member is rotated with respect to a seat member in a housing upon longitudinal movement of the valve ball closure member with respect to the housing, means for equalizing fluid pressures on opposite sides of the ball valve closure member and the seat member before rotary movement of the ball valve closure member with respect to said seat member takes place.

A particular object of the invention is to provide in a ball valve of the character described means for actuating the ball valve of the character described means for actuating the ball valve to rotate the same including means for equalizing pressures on opposite sides of the ball valve and the seat before the ball valve is rotated, including a lost motion connection between the ball valve actuating mechanism and the valve housing and a bypass passage past the ball valve and the seat which is opened and closed upon movement of the ball valve and seat with respect to the housing.

A further object of the invention is to provide in a ball valve of the character described means for rotating the ball valve between opened and closed positions, including means for equalizing the pressures across the ball valve and seat before rotary movement is applied to the ball valve for movement of said ball valve to either the opened or closed position, so that the ball is never rotated with a fluid pressure differential existing across the ball closure member and seat.

Additional objects and advantages of the invention will be readily apparent from the reading of the following description of devices constructed in accordance with the invention, and reference to the accompanying drawings thereof, wherein:

FIG. 1 is a vertical sectional view of a ball valve closure and seat mechanism constructed in accordance with the invention and showing the valve in open position;

FIG. 2 is a horizontal cross-sectional view taken on the line 2-2 of FIG. 1;

FIG. 3 is a vertical sectional view taken on the line 3-3 of FIG. 1;

FIG. 4 is a view partly in elevation and partly in section of the valve operating mechanism of FIG. 1 and showing the valve in closed position;

FIG. 5 is a view similar to FIG. 3 showing the ball valve in an intermediate position with the closure member in closed position with respect to the seat, but with the equalizing bypass open;

FIG. 6 is a fragmentary lower end view of the valve operating sleeve only; and,

Figure 7:
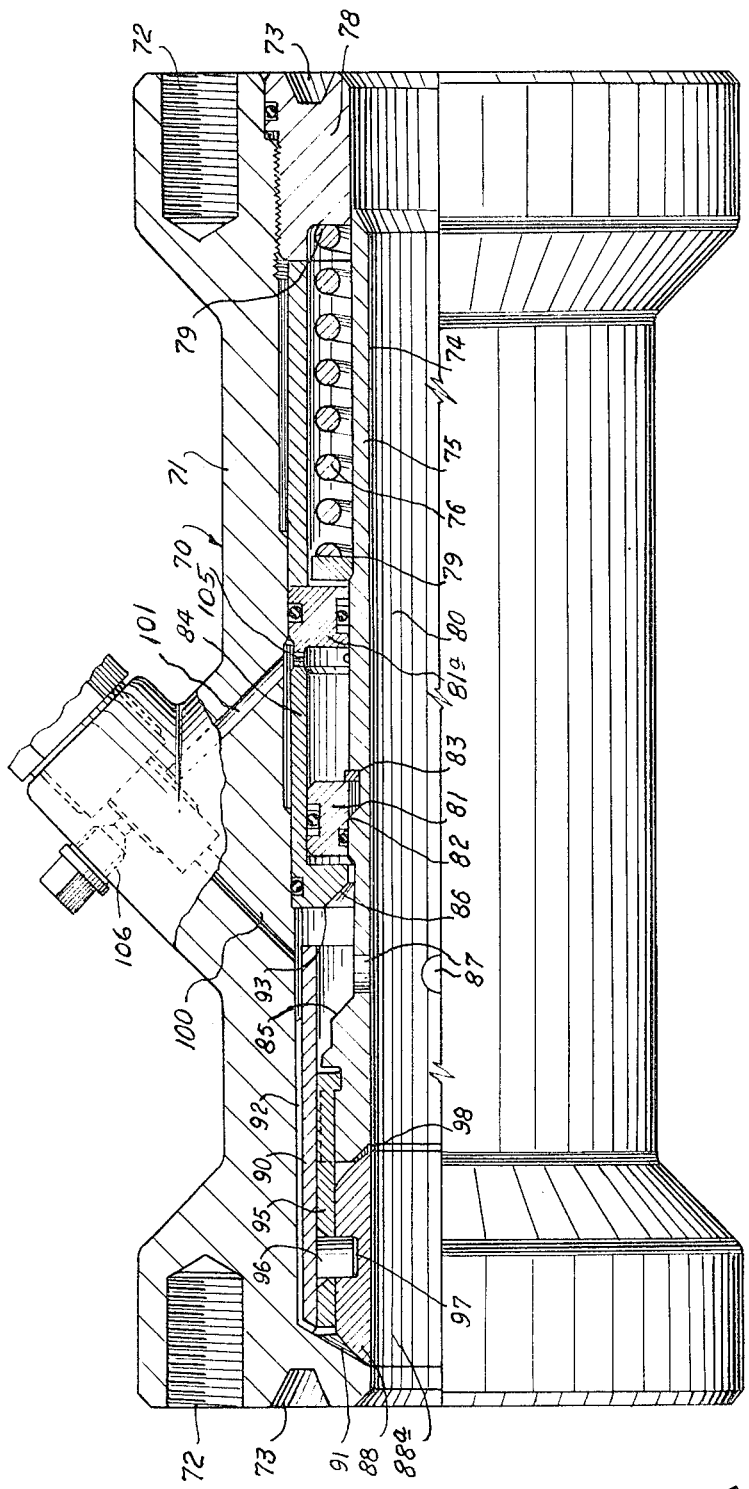
FIG. 7 is a view partly in elevation and partly in section of a modified form of valve constructed in accordance with the invention.

In the drawings, the numeral 10 designates a portion of a valve, which may be a ball valve such as the wireline removable ball-type safety valve illustrated on page 3821 of the 1968—1969 *Composite Catalog of Oil Field Equipment and Services*, or may have a valve structure such as that shown in pages 3817 and 3818, and in the Pat. No. 3,007,669 to John V. Fredd. The ball valve may have a structure of any of the types mentioned, and will include a housing 11 which is adapted to be connected at its upper end to a suitable locking mandrel assembly, as for example the Type N Otis Landing Nipple and Mandrel Assembly on page 3768 of the aforesaid Composite Catalog. Since the landing nipples and locking mandrels may be of any desired type, and since the housing 11 may include actuating mechanisms such as are shown in any of the several illustrations, these parts will not be further specifically described, other than to the extent necessary to disclose the invention.

The housing 11 is provided at its lower end with a tubular seat member 12 having a concave seat 13 formed therein surrounding the bore of the seat member and adapted to be engaged by a rotary ball valve closure member 14 when in open position, as shown in FIGS. 1 and 3. Above the ball valve is an actuating sleeve 15 which is movable longitudinally in the housing 11 and is connected with and moves the ball closure member 14 longitudinally therewith. The ball closure member is operatively connected with the lower end of the sleeve 15 by means of a pair of connector links 17 each having a support pin 18 welded or otherwise suitably secured thereto and engaged in a pair of diametrically opposed recesses 19 formed in the ball and each receiving one of the pins 18. The upper end of each connector link 17 has an inwardly projecting flange or arm 20 which is engaged in an annular slot or groove 21 formed in the enlarged lower portion 22 of the sleeve 15. The extreme lower portion 22a of the sleeve is still further enlarged below the annular groove and this further enlarged portion is provided with a pair of diametrically opposed vertical cutaway slots 23 in each of which the longitudinal upper portion of one of the connector members 17 is slidably disposed. The opposite sides of the ball closure member 14 surrounding the recesses 19 are flattened as at 25, and the lower portions of the connector members 17 are slidable on these flattened surfaces with the pins 18 engaged in the recesses 19 in the ball. A slidable actuating sleeve 30 is disposed in the enlarged lower portion 31 of the bore 32 of the housing 11 and is slidable between a shoulder 33 at the upper end of the lower enlarged portion 31 of the bore and the upper end 34 of the seat member 12 for a purpose which will be hereinafter more fully explained. The flanges 22 and 22a at the lower end of the sleeve 15 are formed with flow bypass flats 22b between the slots 23 to permit fluid flow therepast.

A beveled seat shoulder or surface 40 is formed on the upper end of the enlarged portion 22 at the lower end of the sleeve 15, and this seat shoulder engages a downwardly facing beveled seat 41 formed in the bore of the housing 11 at the upper end of the bore 32. When the sleeve is in the upper position shown in FIG. 4, the seat shoulder 40 engages the seat 41 to close off flow exteriorly of the sleeve 15. When the sleeve is in the lower position shown in FIG. 1, the seat shoulder 40 is spaced below the seat 41 and fluids may flow past the flats 22b or may enter through a lateral equalizing port 43 which may be formed, if desired, in the sidewall of the housing 11 below the seat 41, and will flow through a plurality of lateral ports 28 formed in the wall of the tubular sleeve 15 above the seat shoulder 40 into the bore 16 of the tubular sleeve. With the valve in the open position, all surfaces exposed to pressure in the housing of the valve are equalized. However, when the sleeve is in the upper closed position shown in FIG. 4, the lateral equalizing ports 28 are closed off from communication with the flow bypassing flats 22b and the lateral port 43 in the housing and flow from below the seat 41 inwardly through such ports to the bore 16 of the sleeve is prevented.

The ball closure member 14 seats upon a hardened wear material seat surface 50 formed at the lower end of the bore 16 of the sleeve 15, and when the valve is in the upper closed position, the bore of the sleeve is closed and no flow can take place in either direction through the housing and sleeve.

Guide pins 55 are welded or otherwise suitably secured in an aperture formed in the actuating sleeve 30 on each side of the ball closure member 14 and engage one side of the adjacent connecting links 17. A similar pair of turning pins 60 are also secured by welding or the like to the actuating sleeve on the opposite side of the connector link 17 on each side of the closure member and with the pins 55 maintain the positional relationship of the valve closure member and the connecting links during movement of the valve member and sleeve. The guide pins 55 are sufficiently short that their inner ends will ride along the flattened surfaces 25 of the ball valve as the ball valve and sleeve move with respect to each other. The turning pins 60 engage in angularly disposed grooves or slots 65 formed in the exterior of the ball valve closure member on opposite sides of such closure member, and engage the inclined surfaces of such slots to rotate the ball between opened and closed positions when the ball is moved longitudinally with respect to the actuating sleeve 30 by the connector links 17 moved by the sleeve 15.

As the actuating sleeve 30 is moved upwardly, when the sleeve 15 is moved upwardly, the upper end of the actuating sleeve engages the downwardly facing shoulder 33 in the bore of the housing 11 and further upward movement of the actuating sleeve is stopped. However, the tubular sleeve 15 may continue to move upwardly until the seat shoulder 40 engages the downwardly facing seat 41 in the housing. Such upward movement of the tubular sleeve lifts the connecting links 17, and also lifts the ball closure member 14 upwardly with respect to the actuating sleeve 30. Due to the engagement of the actuating or turning pins 60 in the slots 65 in the ball, the ball will be turned from the open position shown in FIG. 1 to the closed position shown in FIG. 4 during such upward movement. Further details of the construction and operation of the ball valve is contained in the aforementioned Pat. No. 3,007,669 to John V. Fredd.

During upward movement of the ball valve, the pressures in the housing and across the ball closure 14 are equalized, due to the provision of the lateral ports 43 in the housing and 28 in the tubular sleeve valve 15. However, when the valve sleeve has moved upwardly to its uppermost position, with the seat shoulder 40 engaged with the seat 41, the equalizing ports 28 in the sleeve are disposed above the seat and are closed off from flow of fluids from below the seat and from communication with the lateral equalizing ports 43 in the housing. Therefore, all flow through the valve is closed off due to the fact that the ball closure member now is in closed position with respect to the seat 50 at the lower end of the bore of the valve sleeve. Thus, the ball valve will be rotated between open and closed positions under equalized pressure conditions, while the equalizing ports are open, so that there is no pressure differential across the valve to cause a drag in the movement of the valve closure member of to cause wear on the valve closure member.

When the valve is moved from the closed position shown in FIG. 4 to the open position, the valve sleeve 15 is moved downwardly in the usual manner and the connecting links 17 move the ball valve closure member 14 and the actuating sleeve 30 simultaneously downwardly until the lower end of the actuating sleeve engages the upwardly facing upper end no of the seat member 12, whereupon further downward movement of the actuating sleeve is stopped. Further downward movement of the valve sleeve 15 and the connecting links 17 connected with the ball closure member 14 then causes the ball closure member to move downwardly with respect to the actuating sleeve and the turning pins 60 engaged in the slots 65 formed on opposite sides in the ball closure member cause the ball member to be rotated until the flow passage 14a therethrough is moved from the closed position shown in FIG. 4 to the open position shown in FIG. 3 before the closure member engages the seat 13 in the seat member 12. Once the tubular valve sleeve 15 is moved downwardly to move the seat shoulder 40 off the seat 41, the lateral equalizing ports 28 in the valve sleeve 143 placed in communication with the lateral equalizing ports 43 in the housing and fluid pressures are equalized above and below the closure member so that there is no fluid pressure differential across the valve closure member when the closure member is rotated from the closed to the open position. With the closure member in the open position shown in FIG. 1, no differential exists across the valve member itself other than the normal impingement and frictional forces of the flowing fluids.

From the foregoing, it will be seen that the valve closure member is moved from open position to closed position and from closed position to open position under conditions of equalized pressure across the valve closure member.

It is believed readily apparent that, if desired, suitable damping means may be provided on the valve sleeve 15 to limit the rate of movement of the valve sleeve and ball closure member between the open and the closed positions to prevent chattering, hammering and the like.

A modification of the valve is shown in FIG. 7, wherein the valve assembly is adapted to be connected in a tubular flow line. The housing assembly 71 is provided with external annular flanges at its opposite ends having suitable threaded openings 72 for connection to the flanges of a flow line (not shown) in the usual manner. Seal ring grooves 73 are provided in the flanges of the valve housing and receive seal rings (not shown) to seal in the usual manner with the flow conduit in which the device is connected.

The operating structure of the valve is substantially identical to the Type K Otis Flow Line Safety Valve illustrated at page 3836 of the Composite Catalog of Oil Field Equipment and Services, 1968—1969 edition. However, rather than the poppet type valve illustrated in that publication, a ball valve closure member of the invention has been incroporated. An elongate tubular operating sleeve 75 is slidable in the housing 71 and is biased to the left, toward open position, by a spring 76 surrounding the sleeve and confined between a shoulder 77 on the bushing 78 and a stop ring 79 engaged with a beveled shoulder 80 on the exterior portion of the actuating sleeve 75, whereby the spring biases the actuating sleeve to the left. An operating piston 81 is fixed on the exterior of the operating sleeve between a shoulder 82 and a retaining ring 83 and seals between the operating sleeve 75 and the bore wall of a seat sleeve or a cylinder 84 removably secured in the bore of the housing 71. Fluid pressure acting on the piston 81 tends to move the operating sleeve 75 to the right against the force exerted by the spring 76. A seat shoulder 85 is formed on the exterior of the operating sleeve 75 to the left of the sleeve 84 and is adapted to engage a complementary valve seat 86 formed on the left end of the sleeve 84. Equalizing flow ports 87 are formed in the wall of the operating sleeve 75 to the right of the seat shoulder 85, whereby fluid pressure from exteriorly of the sleeve may enter the bore 74 of the sleeve to equalize fluid pressures on opposite sides of the ball closure member 88. An actuating sleeve 90 is slidable in the bore of the housing 71 between the sleeve 84 and an internal annular stop shoulder or seat 91 at the left end of the bore of the housing and said actuating sleeve is provided with longitudinal slots 92 to permit the equalization of fluid pressures longitudinally across the actuating sleeve within the bore of the housing exteriorly of said sleeve. The actuating sleeve engages the stop shoulder 91 at the left end of the flow passage of the housing 71 to stop its movement to the left, and is engageable with the end 93 of the seat sleeve 84 to limit its movement to the right, whereby the actuating sleeve may undergo a limited longitudinal movement within the housing bore similarly to the movement of the actuating sleeve 30 of the form first described. Connecting links 95 have support pins 96 welded or otherwise suitably secured thereto and engaged in diametrically opposed bores 97 in the ball closure member for moving the ball closure member longitudinally with the operating sleeve 75 and relative to the actuating sleeve 90 in the manner already described in connection with the drive of FIGS. 1 through 5.

When the valve is in the open position shown in FIG. 7, the actuating sleeve 90 is engaged with the stop shoulder 91 at the left end of the bore of the housing. Upon movement of the operating valve sleeve 75 to the right, fluid pressures across the valve closure member 88 are equalized due to the provision of the lateral equalizing ports 87 in the operating sleeve and the passages 92 communicating the exterior of the actuating sleeve with the bore of the housing to the left of the ball closure. When the right end of the actuating sleeve 90 engages the shoulder 93 of the cylinder or seat sleeve 84, further longitudinal movement of the actuating sleeve is stopped, and the operating sleeve 75 then moves the valve closure longitudinally until the seat shoulder 85 engages the seat 86 on the left end of the cylinder or seat sleeve 84. Such movement of the operating and actuating sleeves and the valve closure member 88 connected therewith causes rotation of the valve closure member 88 in the same manner as the valve closure member 14 of the form first described, until the flow passage 88a therethrough is turned out of communication with the bore 74 of the operating sleeve. The ball seat 98 at the left end of the operating sleeve 75 is formed of hardened material and is then engaged by the imperforate portion of the ball closure member 88 so that the bore of the operating sleeve is closed. The closure member is moved to its closed position prior to engagement of the seat shoulder 85 on the operating sleeve with the valve seat 86 on the cylinder or seat sleeve 84, so that the valve closure member is moved between open and closed position under conditions of equalized pressure and no pressure differential exists across the closure member during such movement of the same between open and closed position.

The lateral equalizing ports 87 in the operating sleeve are disposed to the right beyond or downstream of the valve seat 86 and the seat shoulder 85 when the valve is in the closed position, and the valve closure member 88 is in the closed position, so that flow through the housing 71 is closed off.

When the condition which caused the valve to move to the closed position has changed, the spring 76 will move the operating sleeve 75 left, moving the ball valve closure member 88 and the actuating sleeve 90 to the left until the left end of the actuating sleeve 90 engages the seat or shoulder 91 in the housing, and further movement of the actuating sleeve is stopped. However, the ball valve closure member is moved further to the left by continued longitudinal movement of the operating sleeve 75 toward the left and the operating or rotating pins (not shown but like the pins 60 first described) in the actuating sleeve 90 turn the ball valve closure member to the open position shown in FIG. 7 in the same manner as the valve 14 was turned in the form first described. It is important to note that this rotary movement of the closure member 88 is accomplished after the seat shoulder 85 is moved off the seat 86, and that fluid pressures present in the housing 71 are equalized longitudinally of the housing and across the valve closure member, so that the closure member is rotated between closed and open positions under conditions of equalized pressures and no pressure differential exists across the closure member during such rotation.

It will also be noted that angularly disposed bypass passages 100 and 101 are formed in the housing and communicate with the bore 92 of the housing on one side of the seat 86 and with the bore of the cylinder 84 on the other side of the seat and downstream of the piston 81 movable in the cylinder. One or more restricted orifices 105 are provided in the cylinder between the cylinder head 81a and the piston 81, and fluid flowing into the cylinder will be limited in its movement entering or leaving the bore of the cylinder by such restriction, and will thus provide a damping means for restraining movement of the operator sleeve 75 longitudinally in the housing and so prevent hammering or high impact of the seat shoulder 85 with the seat 86. This damping effect may be further controlled by provision of a needle valve member (not shown) in the flow passage 100, if desired. The needle valve may be inserted by means of the threaded opening 106 shown in dotted lines in the drawing and engaged against a suitable seat in the passage.

It will therefore be seen that the valve closure member of the invention is applicable to various types of valve operating arrangements, that the valve closure member is rotated between open and closed positions under conditions of equalized pressure and that no pressure differential exists across the ball valve closure member during such rotation. Also, while a ball valve closure member structure has been illustrated and described it is believed readily apparent that any rotary, cylindrical or tapered plug valve closure could equally well be used.

The foregoing description of the invention is explanatory only, and changes in the details of the constructions illustrated may be made by those skilled in the art, within the scope of the appended claims, without departing from the spirit of the invention.

I claim:

1. A valve including: a housing having a flow passage therethrough; an internal annular valve seat in said housing surrounding said flow passage; an elongate tubular sleeve movable longitudinally in said housing flow passage and having an external annular seating shoulder thereon movable therewith into and out of seating engagement with said internal annular valve seat; rotatable valve closure means engaging said tubular sleeve and movable therewith in said housing; said closure means being rotatable with respect to said tubular sleeve to move to a position to close off fluid flow through said tubular sleeve and to a position to open said tubular sleeve to fluid flow therethrough; and fluid flow pressure equalizing means in said housing and in said tubular sleeve on the side of said external seating shoulder opposite said valve closure means operable to equalize pressure in said housing and in said tubular sleeve on opposite sides of said valve closure means when said seating shoulder on said tubular sleeve is out of seating engagement with said external annular valve seat in said housing and before said closure means is rotated with respect to said tubular sleeve.

2. A valve including: a housing having a flow passage therethrough; an internal annular valve seat in said housing surrounding said flow passage; an elongate operator member longitudinally slidable in said housing and having a flow passage therein, said operator member having an external annular seating shoulder thereon engageable with said internal annular valve seat in the housing to close off flow in said housing flow passage exteriorly of said operator member; a rotary valve closure member in said housing connected with said operator member to be moved therewith; said rotary closure member engaging one end of said operator member and being rotatable with respect to said operator member to open and close said flow passage in said operator member, said closure member closing said flow passage of said operator member when said external seating shoulder of said operator member is engaged with said internal annular valve seat of said housing to close off fluid flow through said flow passage in said operator member; and means providing equalizing flow passage means communication said housing flow passage with the flow passage in said operator means when said rotary valve closure member is in position closing said flow passage in said operator member and said external seating shoulder on said operator member is out of engagement with said internal annular valve seat in said housing and before rotation of said rotary valve closure member, whereby said rotary valve closure member is rotatable between positions opening and closing said flow passage of said operator member with fluid pressures thereacross equalized.

3. A valve of the character set forth in claim 1 wherein said fluid flow pressure equalizing means comprises: lateral port means in said tubular sleeve communicating the bore of the sleeve with the flow passage of said housing exteriorly of said sleeve providing a bypass flow passage to the opposite side of said rotary valve closure means; said external seating shoulder on said tubular sleeve and said internal annular valve seat in said housing passage coacting to close off fluid flow through said bypass flow passage when said tubular sleeve member is in one position in said housing and being spaced permitting flow through said bypass flow passage when said tubular sleeve is in another position in said housing.

4. A valve of the character set forth in claim 1 wherein: spaced stop shoulders are provided in said housing; and actuator means is movable in said housing between positions engaging said stop shoulders, said actuator means being operatively connected with said rotatable valve closure means for causing rotating movement of said closure means upon engagement of said actuator means with said stop shoulders and further longitudinal movement of said tubular sleeve and said rotatable valve closure means relative to said actuator means after said actuator means has engaged one of said stop shoulders, said actuator means being movable with said rotatable valve closure means a limited distance between positions engaging said stop shoulders of said housing whereby said rotatable valve closure means is not rotated during such longitudinal joint movement of said actuator means and said tubular sleeve and rotatable valve closure means.

5. A valve of the character set forth in claim 2 wherein: said operator member comprises a tubular sleeve member slidably mounted in said housing having a bore communicating with said housing flow passage and with said rotary valve closure member, said tubular sleeve member being operatively connected with said rotary valve closure member and having said external annular seating shoulder thereon; a lateral port in said tubular sleeve member on the side of the seating shoulder opposite said rotary valve closure member providing said equalizing flow passage means to opposite sides of said closure means when said seating shoulder is out of engagement with said internal annular valve seat in said housing and said rotary valve member is closing the bore of said tubular sleeve member; said seating shoulder on said tubular sleeve member and said internal valve seat in said housing flow passage engaging to close off fluid flow through said equalizing flow passage means when said tubular sleeve member is in one position in said housing and permitting flow through said equalizing flow passage means when said tubular member is in another position in said housing with said seating shoulder out of engagement with said internal valve seat; spaced stop shoulders are provided in said housing; and actuator means is movable a limited distance in said housing between positions engaging said stop shoulders, said actuator means being operatively connected with said rotary valve closure member for causing rotating movement of said closure member upon longitudinal movement of said tubular sleeve member and said valve closure member relative to said actuator means, said actuator means being movable a limited distance with said closure member between said stop shoulders of said housing whereby said closure member is not rotated during such longitudinal joint movement of said actuator means and said tubular sleeve member and said valve closure member, said valve closure member being rotated while said internal valve seat in said housing and said external seating shoulder in said tubular sleeve member are out of engagement and in position permitting flow through said equalizing flow passage means.

6. A valve including: a housing having a flow passage therethrough; a valve seat in said housing surrounding said flow passage; rotatable valve closure and seat means in said housing comprising an elongate tubular seat member slidable in said flow passage and having an external annular seating shoulder thereon engageable with said valve seat in said housing to close off flow exteriorly of said rotatable valve closure and tubular seat member through said housing flow passage; said rotatable valve closure engaging and being rotatable with respect to said tubular seat member between an open position permitting flow through said tubular seat member and a closed position shutting off flow through said tubular seat member, whereby flow through said housing flow passage is cut off when said external annular seating shoulder on said tubular seat member is engaged with said valve seat in said housing flow passage and said rotatable valve closure is in closed position; and fluid flow pressure equalizing means communicating with the flow passage of said housing on opposite sides of said external annular seat shoulder on said tubular seat member for conducting equalizing fluid pressure into said tubular seat member past said rotatable valve closure when said external seating shoulder on said tubular seat member is out of engagement with said valve seat in said housing flow passage, whereby said rotatable valve closure is rotatable between positions opening and closing said flow passage of said tubular seat member with fluid pressures equalized thereacross.

7. A valve of the character set forth in claim 6 wherein said seat means includes: connector means provided between said rotatable valve closure and said tubular seat member for moving said rotatable valve closure with said tubular seat member; and actuator means connected with said housing and with said rotatable valve closure operable to rotate said valve closure on movement of said tubular seat member toward and away from said annular valve seat in said housing flow passage.

8. A valve of the character set forth in claim 7 wherein: said housing has a pair of spaced opposed stop means therein engageable by said actuator means, and said actuator means is movable a limited distance in said housing with respect to said stop means between points of engagement therewith, engagement of said actuator means with said stop means stopping movement of said actuator means and permitting movement of said tubular seat member and said rotary valve closure with respect to said actuator means to cause rotation of said rotary valve closure between open and closed positions with respect to said tubular seat member.

9. A valve of the character set forth in claim 6 wherein means is provided in said housing restraining movement of said tubular seat member and operable to cause rotary movement of said valve closure between open and closed positions with respect to said tubular seat member.

10. A valve including: a housing having a bore with an internal annular valve seat therein; an elongate tubular sleeve movable longitudinally in the housing and having an external annular seating shoulder thereon engageable with the valve seat in the housing; a rotatable closure member having a flow passage therethrough connected to the tubular sleeve and rotatable between positions opening and closing the bore of the tubular sleeve; actuator means on said housing and said rotatable closure member for rotating said closure member between open and closed positions and operable to rotate said closure member to closed position to close the bore of the tubular sleeve before said external seating shoulder on said tubular sleeve engages said valve seat in said housing and to hold said closure member in such bore closing position while said seating shoulder is engaged with said valve seat, said actuator means being operable to rotate said closure from said position closing said bore of said sleeve to a position opening said bore after said seating shoulder has been moved out of engagement with said valve seat in said housing and to hold said closure member in open position while said seating shoulder is out of engagement with said valve seat.

11. A rotary closure valve including: a housing having a bore with an internal annular valve seat therein surrounding said bore intermediate its ends; and elongate tubular sleeve slidable longitudinally in said housing and having an external annular seating shoulder thereon movable into and out of engagement with said valve seat in said housing bore; a rotatable valve closure member engageable with one end of said sleeve on the side of said external seating shoulder opposite said valve seat in the housing bore; means operatively connecting said rotatable valve closure member with said tubular sleeve for movement therewith and for rotation between positions opening and closing the bore through the sleeve; actuator means in said housing connected with said valve closure member for rotating said valve closure member between open and closed positions as said tubular sleeve moves longitudinally of said housing; means providing a lost motion connection between said housing and said actuator means permitting longitudinal movement of said tubular sleeve, said rotatable closure member and said actuator member without rotation of said rotatable closure member, whereby said tubular sleeve is movable into and out of engagement with said internal annular valve seat in said housing while said rotatable closure member is in position closing the bore of said sleeve; and bypass means in said housing and in said tubular sleeve for conducting fluid pressure between the bore of the tubular sleeve and the portion of the rotatable closure member opposite the end of the tubular sleeve and exposed in the flow passage of the housing, whereby the rotatable closure member may be rotated between open and closed positions under conditions of equalized fluid pressure.